No. 727,783. PATENTED MAY 12, 1903.
J. L. GILES.
ENDLESS CONVEYER OR ELEVATOR.
APPLICATION FILED JAN. 8, 1903.
NO MODEL.

Witnesses
Elmer Seavey
E. Edmonton

Inventor
Joseph L. Giles
By
Geo. R. Laughlin
his Attorney

No. 727,783. Patented May 12, 1903.

UNITED STATES PATENT OFFICE.

JOSEPH L. GILES, OF JOPLIN, MISSOURI.

ENDLESS CONVEYER OR ELEVATOR.

SPECIFICATION forming part of Letters Patent No. 727,783, dated May 12, 1903.

Application filed January 8, 1903. Serial No. 138,254. (No model.)

*To all whom it may concern:*

Be it known that I, JOSEPH L. GILES, a citizen of the United States, residing at Joplin, county of Jasper, and State of Missouri, have invented certain new and useful Improvements in Endless Conveyers or Elevators, of which the following is a specification.

My invention relates to endless conveyers or elevators.

My object is to provide an endless conveyer or elevator of simple, strong, and durable construction, utilizing sheaves, buckets, clamps, and cables of improved construction which render splicing, repair, or removal of the cables easy and satisfactory, insure retention of the cables on the sheaves, and avoid all slipping of the cables, while also permitting convenient removal of the buckets.

Having the foregoing objects in view, the invention consists of certain improved features and novel combinations set forth hereinafter and embodied in the claims hereto appended.

Figure 1:
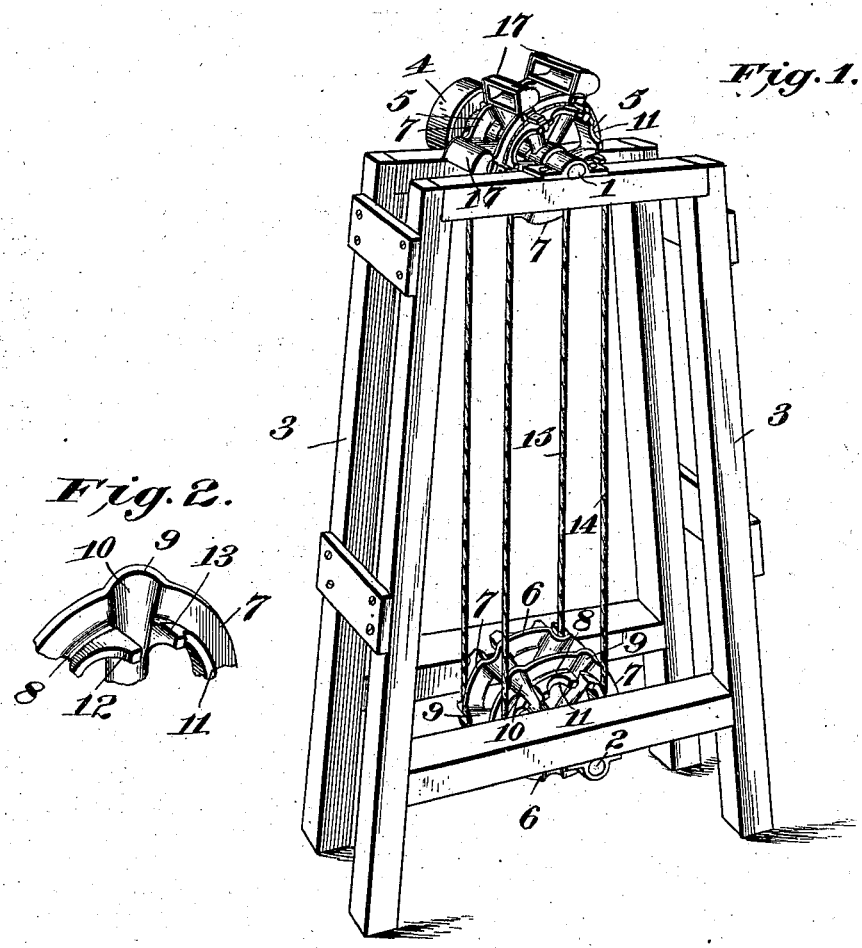
Figure 3:
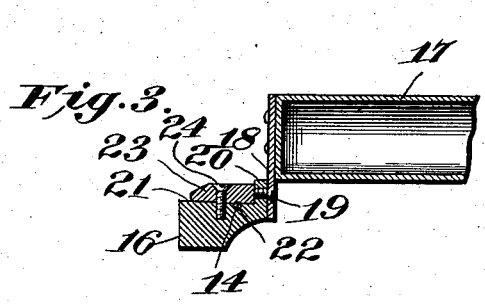
Figure 4:
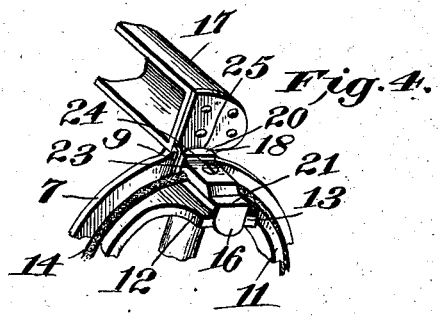

In the accompanying drawings, Figure 1 is a perspective; Fig. 2, a detail of one of the sheaves; Fig. 3, a detail of one of the clamps and bracket connecting the bucket thereto; and Fig. 4, a detail showing the association of a sheave, clamp, and bucket.

The upper or drive shaft 1 and the lower shaft 2 of the elevator or conveyer are suitably journaled in an upright frame 3. A band-pulley 4 is on the upper shaft, whereby the conveyer or elevator is driven. Secured on the drive-shaft 1 are duplicate sheaves 5, and secured on the shaft 2 are sheaves 6, similar to sheaves 5. The sheaves have an inner peripheral flange 7 and a peripheral groove 8. The flange 7 is flared at regular intervals into pockets 9, having an inner rounded and downwardly-inclined face 10, while at the forward and rearward margins of the pocket and at the rim 11 the sheave has the projecting ears 12 and 13.

The cables 14 and 15 extend around the respective sets of sheaves in the grooves 8 thereof, and each has its ends connected or spliced by one of the clamps 16, to which the buckets 17 are connected, said buckets being connected at one end to a clamp on cable 14 and at the other end to a clamp on cable 15 by the respective brackets 18, secured to the bucket and detachably bolted at 19 to an outwardly-extending flange or lip 20 on the clamp, which is adapted to fit into the pocket 9 and conform to the shape of the latter. The body of the clamp has a flat top face 21, provided with a groove 22, which receives the cable, the latter being held in the groove by a clamp-plate 23, held to face 21 by a set-screw 24. The back of the clamp-body is rounded at 25 to fit the inclined back of the pocket 9, and the ears 12 and 13 embrace the clamp-body. The clamp-plate 23 also secures the ends of the cable wherever it may be separated.

The buckets and the grooves of the sheaves prevent lateral displacement of the cables from the sheaves, and the ears 12 and 13, coacting with the clamps, cause the cables to move in unison with each other and with the sheaves and prevent all slipping.

Having thus described my invention, what I claim as new, and desire to secure by Letters Patent, is—

1. In an elevator or conveyer, a sheave having a band or cable receiving rim and a flange on the rim, said flange being provided with pockets.

2. In an elevator or conveyer, a sheave having a band or cable receiving rim and a flange on the rim, said flange being provided with laterally flared or offset portions having pockets.

3. In an elevator or conveyer, a sheave having a flange provided with pockets having curved and inclined walls.

4. In an elevator or conveyer, a sheave having a band or cable receiving rim and a flange on the rim provided with pockets having inclined bottom walls.

5. In an elevator or conveyer, a sheave having laterally-extending ears or lips on its band or cable receiving portion.

6. In an elevator or conveyer, a sheave having notches in its band or cable receiving portion, and laterally-extending ears or lips on the opposite margins of said notches.

7. In an elevator or conveyer, a sheave having a flange and provided with notches or pockets in said flange and in the band or cable receiving portion of the sheave, and ears projecting laterally from the sheave on the opposite margins of the notches or pockets.

8. In an elevator or conveyer, the combination with a cable and sheaves having clamp-engaging means, of clamps comprising a body and a clamp-plate for securing the body to the cable, and a bucket secured to the clamp-body.

9. In an elevator or conveyer, the combination with a cable and sheaves having clamp-engaging means, of clamps comprising a body having a flange, a clamp-plate securing the clamp-body to the cable, and a bucket detachably connected to the flange on the clamp-body.

10. In an elevator or conveyer, the combination with a cable and sheaves having clamp-engaging means, of clamps comprising a body having a flat top provided with a groove receiving the cable, a clamp-plate for clamping the cable, a fastening removably connecting the clamp-plate to the body, a flange on the body, a bucket, a bracket on the bucket, and a detachable fastening connecting the bracket and flange.

11. In an elevator or conveyer, the combination with a sheave having a flange provided with a pocket and a notch in the cable-receiving portion of the sheave, of a cable on the sheave, a clamp having a body received in the notch and pocket aforesaid, a clamp-plate securing the cable to the clamp-body, and a bucket secured to the clamp-body.

In testimony whereof I hereunto affix my signature in presence of two witnesses.

JOSEPH L. GILES.

Witnesses:
N. W. MOON,
R. W. SWEARINGEN.